United States Patent Office 3,660,334
Patented May 2, 1972

3,660,334
STRIPPABLE WAX COATING COMPOSITIONS
Dominic Apikos, Park Forest, Ill., assignor to Atlantic Richfield Company, New York, N.Y.
No Drawing. Original application June 10, 1966, Ser. No. 556,555, now Patent No. 3,518,215, dated June 30, 1970. Divided and this application Jan. 12, 1970, Ser. No. 2,383
Int. Cl. C08f 45/52
U.S. Cl. 260—28.5                                13 Claims

ABSTRACT OF THE DISCLOSURE

This invention relates to a strippable wax coating containing an ethylene-vinyl acetate polymeric composition and a stripping agent which is either an N-substituted fatty acid amide or a nitrogen containing compound containing a fatty acid residue. Particularly preferred are wax compositions which contain as the stripping agent an N-substituted fatty acid amide containing a fatty acid residue having from 10 to 17 carbon atoms. The composition can also contain minor amounts of a mineral oil to increase the strippability.

CROSS REFERENCE TO RELATED APPLICATION

This application is a division of my pending application, Ser. No. 556,555 filed June 10, 1966, entitled "Strippable Wax Coating Compositions" now U.S. 3,518,215.

BACKGROUND OF INVENTION

Strippable coatings are well-known in the art. They are utilized in applications wherein it is desirable to provide temporary surface protection against abrasion, rust, dirt and other damage occurring in storage and handling. After the necessary protection period has expired, it is desirable that these coatings be removed with a minimum of time and effort. These requirements have led to the development of various compositions which may be deposited as coatings upon a surface and thereafter removed as essentially continuous films. For example, polyvinyl chloride plastisols can be deposited, cured, and then peeled from a surface. This coating is very expensive and therefore, can only be economically deposited in thicknesses of a few mils. Furthermore, a strippable coating is produced only after the liquid plastisol has been properly cured at temperatures in the order of 300° F.

In order to eliminate the necessity of a cure, hot melt coatings have been produced from cellulosic materials such as ethyl cellulose in combination with large proportions of mineral oil. These compositions usually are quite odorous, have oily surface appearances and require coating temperatures in excess of 300° F. Other hot melt coatings such as those made from wax alone are not strippable. The addition of various polymers including ethylene-vinyl acetate copolymers imparts physical strength to the wax film but it also increases the adhesive bond between the surface and the film. In order to impart strippability, various additives such as mineral oil, fluorinated compounds, silicones and partial esters have been incorporated into these wax-polymers compositions. These additives either impart high cost, poor coating appearance or necessitate extensive coating techniques.

It has now been found that outstanding strippable coatings can be produced by combining wax with ethylene-vinyl acetate copolymers and minor amounts of certain nitrogen-containing compounds. These compositions offer excellent strippability, low cost and they do not require complex coating processes. The coating compositions of this invention can be economically applied in considerable thicknesses using a hot melt technique without need of any subsequent cure.

The compositions of this invention may be used to protect the surfaces of metals such as aluminum, steel, zinc, brass, and chromium or the surfaces of various plastic or synthetic products such as laminates of phenol-formaldehyde, melamine-formaldehyde and urea-formaldehyde resins, phonograph records, and the surfaces of many natural products such as wood paneling, flooring strips and the like. In general, the compositions of this invention may be utilized on any solid surface, such as glass, ceramic or mica, which forms a minimum adhesive bond with the coating.

It is an object of this invention to provide wax compositions which may be deposited upon a surface and thereafter completely removed from the surface as essentially continuous films.

It is a further object of this invention to provide articles of manufacture which have these strippable wax compositions deposited upon their surfaces.

The compositions of this invention comprise in parts by weight:

(A) 100 parts of wax; and, (B) From 10 to 300 parts of a polymeric composition consisting essentially of:

(i) from 40–100 weight percent of an ethylene-vinyl acetate copolymer wherein the vinyl acetate content ranges from 15–35 weight percent, and (ii) from 0–60 weight percent of a compound which is a plasticizer for the ethylene-vinyl acetate copolymer, (C) In an amount sufficient to impart strippability at least one stripping agent selected from the group consisting of (i) an N-substituted fatty acid amide having a structural formula:

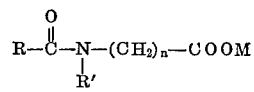

wherein R is an aliphatic radical containing 10–30 carbon atoms, R' is an alkyl group containing 1–4 carbon atoms, n is an integer from 1–4 and M is selected from the group consisting of hydrogen and alkali metals having an atomic number of less than 20.

(ii) a nitrogen containing compound having the following structural formula:

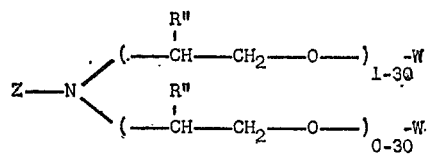

wherein W is a radical selected from the group consisting of hydrogen and an alkyl radical containing 1–6 carbon atoms, R" is hydrogen or a methyl radical, Z is a radical selected from the group consisting of

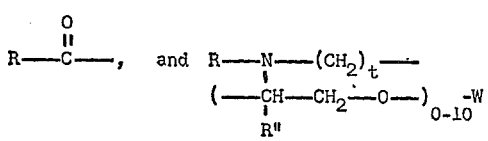

wherein R is an aliphatic radical containing 10–30 carbon atoms and t is an integer from 1–6, and R" is hydrogen or a methyl radical.

(D) From 0–20 parts of a hydrocarbon oil having a viscosity at 210° F. in excess of 25 SSU.

The N-substituted fatty acid amides and the nitrogen containing compounds must be present in the compositions within a certain critical concentration range. The concentration must be sufficient to impart strippability without completely destroying the bond between the surface and the coating. In order to be considered strippable, it is necessary that the coating be capable of being totally removed from the surface as essentially continuous films. These critical concentrations are dependent upon the type of stripping agent utilized, the type and amount of other components present, and the degrees of strippability desired. In most compositions, strippability is obtained with concentrations as low as 0.5 part by weight in 100 parts wax. Concentrations which range from 1–5 parts by weight per 100 parts wax have been found to be most satisfactory. Higher concentrations, while operable, are accompanied by substantial migration to the surface of the coating. The extent of this migration varies with the particular stripping agent and in general is related to its wax compatibility. This migration may totally destroy the adhesive bond, or provide an unattractive coating appearance and feel.

The N-substituted fatty acid amides which can be utilized in the practice of this invention have the following structural formula:

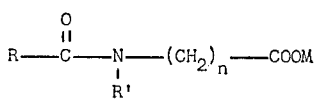

wherein M is hydrogen or an alkali metal having an atomic number of less than 20. Preferably M is hydrogen or sodium and most preferably, it is hydrogen. $n$ is an integer from 1–4 and preferably is 1. R' is an alkyl group containing 1–4 carbon atoms preferably, methyl. R is an aliphatic radical containing 10 to 30 carbon atoms, and can be saturated or unsaturated, and linear or branched chain. It can be derived from the hydrocarbon residues of monocarboxylic fatty acids. These hydrocarbon residues can be substituted with a pendant oxygen atom such as a keto or hydroxyl group or an ester linkage. Suitable hydrocarbon residues which can be utilized include but are not limited to the residues derived from saturated acids such as n-undecyclic, lauric, myristic, n-pentadecyclic, palmitic, margaric, stearic, avachidic, behenic, lignoceric, cerotic, n-heptacosoic and n-hentriacontoic; unsaturated acids such as the mono-ethenoid, caproleic, 10-decylenic, lauroleic, palmitoleic, oleic, elaidic, erucic, selacholeic and lumegueic acids; the polyethenoid acids such as linolelaidic, eleostearic, punicic, linolenic and moroetic acids; substituted acids such as ricinoleic, lanoceric and licanic acids; branched chain acids such as 2-methyldodecanoic, 14-ethyl hexadecanoic, 18-n-propyl heneicosanic, 2-methyl tetracosanoic, 9-octyl heptadecanoic, 3,3-dimethyloctadecanoic and 2,9-dimethyloctadecanoic acids. Preferably R is a linear, aliphatic radical containing 10–17 carbon atoms. Most preferably, R is the hydrocarbon residue derived from stearic acid and has the formula ($C_{17}H_{35}-$).

The following specific N-substituted fatty acid amides are illustrative of the different types which can be utilized in the compositions of this invention.

N-butyl,N-(2-carboxyethyl)-6-octyl-9-dodecenamide
N-methyl,N-(4-carboxybutyl)-octadecanamide
N-(3-carboxypropyl)-2,7-dimethyl-3,10-octacosadienamide
N-ethyl,N-(4-carboxybutyl)-12-n-hexyl octadecanamide
N-methyl,N-(2-carboxyethyl)-dodecanamide
N-(5-carboxypentyl)3,9-diethyl-tetradecanamide
N-ethyl-N-(5-carboxypentyl)-2,6,8-tripropyl undecanamide
N-methyl,N-(2-carboxyethyl)-octadecanamide
N-ethyl,N-(3-carboxypropyl)-heptadecanamide
N-butyl,N-(3-carboxypropyl)-undecanamide
N-propyl,N-(3-carboxypropyl)-octadecanamide
N-propyl,N-(2-carboxyethyl)-hexadecanamide
N-butyl,N-(4-carboxybutyl)-pentadecanamide
N-butyl,N-(3-carboxypropyl)-4,7,7-trimethyl-undecanamide
N-butyl,N-(4-carboxybutyl)-hexadosanamide
N-(3-carboxypropyl)-triacontanamide
N-(2-carboxyethyl)-10-decenamide
N-methyl,N-(2-carboxyethyl)-9-octadecenamide
N-propyl,N-(5-carboxypentyl)-21-triacontenamide
N-ethyl,N-(2-carboxyethyl)-12,14-dimethyl-9-hexadecenamide
N-(3-carboxypropyl)-15-pentyl-9-eicosenamide
N-methyl,N-(2-carboxyethyl)-9,12-octadecadienamide
N-ethyl,N-(3-carboxypropyl)-9,11,13-octadecatrienamide
N-methyl,N-(2-carboxyethyl)-9-dodecenamide
N-methyl,N-(2-carboxyethyl)-6-octadecenamide
N-propyl,N-(5-carboxypentyl)-4,8,12,15,18,21-tetracosahexanenamide
N-butyl,N-(3-carboxypropyl)-12-hexyl-6,10-hexadecadienamide
N-propyl,N-(4-carboxybutyl)-6,14-dibutyl-9-octadecenamide
N-ethyl,N-(2-carboxyethyl-9-octadecynamide
N-methyl,N-(2-carboxyethyl)-12-hydroxy-9-octadecenamide
N(2-carboxyethyl)-4-oxo-9,11,13-octadecatrienamide
N-methyl,N-(2-carboxyethyl)-16-hydroxy-hexadecanamide And the sodium, potassium or lithium salts thereof.

The preparation of these amides is not critical to the pricatice of this invention. For example, these compounds can be prepared by replacing the hydroxyl group of an aliphatic fatty acid with an amine reactive ion such as chlorine and then reacting the acid chloride with an ester of an amino acid followed by saponification of the product to the acid. The alkali metal salts can be produced by reacting the ester with a suitable alkali metal base. Specifically, the preferred amide, stearoyl sarcosine, can be prepared by reacting stearic acid chloride with n-methyl ethyl glycinate followed by saponification.

The nitrogen containing compounds which can be utilized in the practice of this invention have the following structura formula:

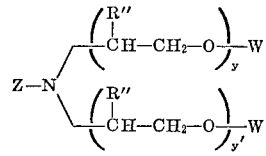

W is selected from the group consisting of hydrogen and a lower alkyl radical containing up to about six carbon atoms. Preferably it is hydrogen. R'' is hydrogen or a methyl radical. Preferably it is hydrogen. Z is a radical selected from the group consisting of

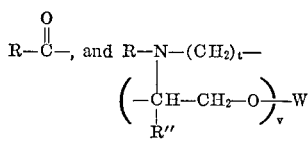

Preferably Z is (R—CO—). R is an aliphatic radical containing 10–30 carbon atoms and can be saturated or unsaturated, linear or branched chain, and can be substituted with a pendant oxygen atom such as a keto or hydroxy group or an ester linkage. It can be derived from the hydrocarbon residues of monocarboxylic fatty acids. Examples of monocarboxylic acids whose hydrocarbon residues can be utilized were heretofore set forth in the discussion of the N-substituted fatty acid amides. Preferably, R is a linear aliphatic radical containing 10–17 carbon atoms. Most preferably, R is a mixture of the hydrocarbon residues derived from tallow which contains approximately 25 percent by weight palmitic acid, 35 percent by weight stearic acid and 45 percent by weight oleic acid. The hydrocarbon residues of other naturally occurring fatty acid mixtures such as coconut oil and soy bean oil can be utilized. $t$ is an integer from 1–6 and preferably is 3.

It has been found that the marginal strippability is attained when the molecular weight of each alkoxy chain defined by $y$ and $y'$ exceeds 1320 or when the molecular weight of the alkoxy chain defined by $v$ exceeds 220. It is also critical that the compound contain at least one alkoxy radical bonded to the nitrogen atom. Therefore, with respect to these limitations the value of $y$ can range from 1 to about 30 and the value of $y'$ can range from zero to about 30. The value of $v$ ranges from zero to about 10. Preferably, the alkoxy chains $y$ and $y'$ are substantially equal in length. Preferably, $y$ and $y'$ range from 1–5 and $v$ ranges from 1–3. Most preferably, $y$, $y'$ and $v$ are each 1.

Specific alkoxylated compounds wherein Z is equal to (R—CO—) include but are not limited to:
N-ethoxy-dodecanamide
N,N-di(polyethoxy)-octadecanamide
N,N-di(polyethoxy)-9,12-octadecadienamide
N,N-di(polyethoxy)-9,12,15-octadecatrienamide
N,N-di(poly-1,2-propoxy)-6,12-dipentyl-9-tetradecenamide
N,N-di(poly-1,3-propoxy)-18-isobutyl-tetracosanamide
N,N-di(polyethoxy)-hexadecanamide
N,N-di(polyisobutoxy)-2-isopropyl-12-tridecenamide
N,N-di(poly-1,4-butoxy)-6,9-dihydroxy-tetradecanamide
N,N-di(poly-1,4-butoxy)-7,9-dioxo-5-hydroxy-pentadecanamide
N,N-di(ethoxy)-octadecanamide
N,N-di[poly-(2,3-butoxyethoxy)]-eicosanamide
N,N-di[poly(1,3-propoxy-1,2-propoxy)]-12-hexadecynamide
N,N-di(polymethoxy)-2,4,8-trimethyl-tetradecanamide Specific alkoxylated compounds wherein Z is

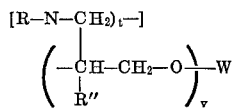

include but are not limited to:
N-(6-aminohexy)-N,N'-tri(poly-1,2-propoxy)-4,8-diethyloctanediamine
N-(3-aminopropyl)-N,N'-di(poly-2,3-butoxy)-9-hexadecenediamine
N-(4-aminobutyl)-N',N'-di(poly-1,4-butoxy)-hexadecane diamine
N-(3-aminopropyl)-N,N',N'-tri(poly-1,3-propoxy)-8,12-dihydroxy-hexadecane diamine
N-(3-aminopropyl),N,N',N'-tri(polyethoxy)-4-oxo-11-tetradecene diamine
N-(2-aminoethyl)-N-(poly-1,2-propoxy)-N'-(poly-2,3-butoxy)-N'-(polyethoxy)-3,6,8-trimethyl-tetradecane diamine
N-(aminomethyl)-N,N'-di(polyethoxy)-12-tetradecene diamine
N-(5-aminopentyl)-N,N',N'-tri(polymethoxy)-octadecane diamine
N-(3-aminopropyl)-N,N',N'-tri(polyethoxy)-ocatdecane diamine
N-(4-aminobutyl)-N,N',N',-tri(poly-1,3-propoxy)-9,12-octadecadiene diamine
N-(5-aminopentyl)-N,N',N'-tri(polyethoxy)-4,8,12,15-octadecatetraenoic diamine
N-(aminomethyl)-N,N',N'-tri(polyisobutoxy)-6-methyloctadecene diamine
N-(2-aminomethyl)-N',N'-di(poly-1,2-propoxy)-octadecane diamine
N-(6-aminohexyl)-N,N',N'-tri(poly-1,4-butoxy)-9-octadecyne diamine
N-(4-aminobutyl)-N,N',N'-tri(polyethoxy)-14-pentyl-heptadecane diamine
N-(3-aminopropyl)-N,N',N'-tri(polyethoxy)-octacosane diamine
N-(3-aminoprophyl)-N,N',N'-tri(ethoxy)-hexadecane diamine
N-(3-aminopropyl)-N,N',N'-tri(propoxy-1,3)-octadecane diamine The preparation of the nitrogen containing compound is not critical to the practice of this invention. For example, compounds wherein Z is (R—CO—) can be prepared by alkoxylating the amide of the corresponding fatty acid. Compounds wherein Z is R—N—(CH$_2$)$_t$— can be prepared by reacting an N-aliphatic alkylene diamine having the formula (R—NH—(CH$_2$)$_t$—NH$_2$) with an alkylene oxide.

The wax component of this invention can be any wax which can be deposited upon a surface as a molten or solvent cut coating and thereafter changed into a solid phase by cooling or by evaporation of the solvent. These waxes can be of mineral, vegetable, animal or synthetic origin. Mixtures of various waxes can also be utilized. Exemplary of waxes having a mineral origin are the petroleum and hydrocarbon waxes such as paraffin, microcrystalline, slack, ozocerite and montan waxes. Waxes having a vegetable origin are carnauba, candelilla, Japan waxes and the like. Waxes having an animal origin include bees, Chinese, insect and similar waxes. In the animal and vegetable waxes the main constituents are high molecular weight esters and saturated hydrocarbons and lesser amounts of alcohols and acids. Exemplary of the synthetic waxes include those produced by the esterification of polyhydric alcohols or by the hydrogenation of vegetable oils or those made by the Fischer-Tropsch synthesis or substituted waxes such as oxidized or chlorinated polyethylene wax.

The use of petroleum waxes represents a preferred embodiment of this invention. These waxes include paraffin waxes which have a melting point from about 115° F. to about 200° F. and the microcrystalline waxes having a melting point from about 140° F. to 210° F. These waxes may be fully refined and thus contain very small amounts of hydrocarbon oils or they may be semi-refined (slack waxes) and have hydrocarbon oil contents of up to about 30 percent. As more fully discussed hereafter, oils of this type may be added to the compositions of this invention to enhance the strippability of the coating in amounts ranging up to 20 percent of the total composition. Therefore, in determining an upper oil loading, the amount which is present due to the addition of a semi-refined wax should be included.

The most preferred compositions of this invention utilize 100 percent by weight microcrystalline wax having a melting point ranging from 140° F. to 210° F. or a combination of petroleum waxes comprising from 20 to 80 percent by weight of a paraffin wax having a melting point ranging from about 120° F. to about 180° F. and from 80 to 20 percent of microcrystalline wax having a melting range from about 140° F. to about 210° F. This wax mixture provides strippable coating which can be utilized in high temperature applications. Increasing the concentration of microcrystalline wax will impart a higher maximum use temperature and improve the ultimate physical strength while decreasing dimensional stability. With respect to paraffin waxes as a class the use of a nonnormal paraffin wax imparts higher physical strength than the normal base paraffin waxes.

The copolymers which can be utilized in the practice of this invention are solid thermoplastic polymers produced by polymerizing a major amount of ethylene with a minor amount of vinyl acetate. These copolymers should be solid at ambient temperatures (i.e. 70° F.) and have a molecular weight sufficient to impart film strength without requiring excessive copolymer concentrations. The molecular weight can be further defined through the term "melt index" as determined by ASTM D 1238–62. In general, the operable copolymers have melt indexes of less than 500. Preferably, the melt index is less than 25 and most preferably, less than 5. Copolymers having melt indices as low as .5 have been prepared in the laboratory and have been found to impart outstanding strength characteristics. The vinyl acetate concentration in the copolymers can range from 15 to 35 percent by weight. The higher concentration defines the practical limits of copolymer compatibility with the wax. Copolymers having a vinyl acetate content of less than 15 percent are more compatible but excessive copolymer concentrations are necessary to impart the desired film properties. The optimum film properties are obtained with copolymers having a vinyl acetate concentration ranging from 25 to 30 weight percent and are therefore preferred in the compositions of this invention.

The ethylene-vinyl acetate copolymers can be utilized in the practice of this invention alone or in conjunction with a compound which is a plasticizer for the copolymer. Exemplary compounds which are recognized as plasticizers for ethylene-vinyl acetate copolymers include but are not limited to monomeric plasticizers such as dioctyl phthalate, butyl phthalyl glycollate and aceto tributyl citrate or higher molecular weight plasticizer such as hydrocarbon oils, polyterpenes, polybutenes, epoxidized soy bean oil, coumaroneindene resins, polystyrene and organic carboxylic acids. These plasticizers in general have molecular weights of less than 3,000 are compatible with wax at the blending and application temperatures and have boiling or degradation temperatures which are higher than the temperatures incurred during coating. The coumarone-indene resins represent a preferred class of plasticizers. They are prepared by the catalytic polymerization of coal-tar, light-oil fractions boiling between 150° C. and 200° C. This fraction is commonly called crude heavy solvent and contains primarily indene, styrene, cyclopentadiene and their methyl homologs and minor amounts of coumarone. These resins have a softening point of less than 100° C. as determined by the ring and ball method described in ASTM Test Number D-36- the ethylene-vinyl acetate copolymers also represents a The use of organic carboxylic acids as plasticizers for the ethylene-vinyl acetate copolymers also represents a preferred embodiment in this invention. This carboxylic acid must be wax compatible, have an acid number in excess of about 20 and a molecular weight ranging from 150 to 3,000. Preferably, the acid number is in excess of 30. Compounds with low acid numbers and high molecular weights, i.e., oxidized polyethylene are not desirable because they increase the viscosity of the molten composition without imparting the desired properties. Any aliphatic, acyclic or aromatic acid having one or more carboxyl groups can be utilized. For example, dimerized and trimerized fatty acids, rosin acids and naphthoic acids can be also utilized.

The ethylene-vinyl acetate copolymer should be utilized in amounts sufficient to impart physical strength to the coatings thus allowing them to be stripped from the surface as essentially continuous films. This requires a proper balance between the adhesive and cohesive forces with the adhesive force being less than the cohesive force. As the concentration of copolymer is increased, the physical strength of film is also increased. However, accompanying this improvement, is an increase in melt viscosity and in processing and material costs. Therefore, from both economic and processing viewpoints, the copolymer concentration shoudl be the optimum required to impart the necessary strippability. A portion of the ethylene-vinyl acetate copolymer can be replaced by the plasticizers heretofore described. This copolymer-plasticizer mixture is hereafter described in the specification and claims as the poly-composition. This composition consists essentially of from 40 to 100 percent by weight of a n ethylene-vinyl acetate copolymer and from 0 to 60 percent by weight plasticizer. Most preferably, the plasticizer concentration ranges from 5 to 30 percent. The amount of polymeric composition which can be utilized in the compositions of this invention can range in amounts from 10 parts to 300 parts by weight of wax. Therefore, the copolymer can range in concentrations of from 4 to 300 parts per 100 parts of wax, and the plasticizer concentration can range from 0 to 180 parts per 100 parts wax. When the maximum plasticizer concentration of 180 parts is utilized, the maximum copolymer concentration is 120 parts. The most preferred concentration of polymeric composition ranges from 20 to 110 parts per 100 parts of wax.

As previously stated, a hydrocarbon oil can be added to the composition of this invention to aid in strippability, impart a plasticizing effect and lower the hot melt viscosity. This hydrocarbon oil has a viscosity at 210° F. of greater than 25 SSU and preferably from about 35 to about 500 SSU at 210° F. A preferred oil is a highly refined n-paraffin petroleum oil having a viscosity of from 43 to 45 SSU at 210° F. The oils can be incorporated into the compositions of this invention in amounts ranging up to about 20 parts per 100 parts wax, however, excessive oil loading will greatly reduce tensile strength. Preferably, the oil concentration ranges up to about 15 parts and most preferably from 1 to 10 parts. As previously stated, some petroleum waxes commonly known as semi-refined waxes contain substantial amounts of oil. When these semi-refined waxes are utilized in this invention, its oil content should be taken into account in determining the maximum or optimum oil loading. In determining a common parts basis, the inherent oil content of semi-refined wax should be excluded.

Ingredients commonly added to wax or ethylene-vinyl acetate copolymers can be incorporated into the compositions of this invention in functional amounts without departing from the scope thereof. Examples of these ingredients include but are not limited to: heat and ultraviolet light stabilizers, inert fillers, secondary plasticizers, anti-blocking agents, pigments and colorants, anti-oxidants, gloss stabilizers, viscosity-index improvers, solvents, anti-scuff agents, etc.

The preparation of the compositions of this invention is not critical to the practice thereof and can be conducted under any suitable method. For example, these compositions can be prepared by heating the wax to a temperature above its melting point, adding the ethylene-vinyl acetate copolymer, stripping agent and other additives and agitating vigorously until a homogeneous hot melt is obtained.

When a plasticizer is utilized, it is preferable to incorporate the plasticizer into the melted wax prior to the addition of the copolymer in order to facilitate the dispersion of the copolymer. Similarly, a coating composition can be prepared by combining ingredients with a common solvent. A specific method for preparation is as follows: The waxes are melted together, any anti-oxidants or heat stabilizers are added and the melt is then brought to a temperature above about 275° F. The plasticizer, if it is not free flowing, is heated to about 275° F. and then added to the hot melt. The ethylene-vinyl acetate copolymer is then added to the melt accompanied by vigorous stirring while maintaining the melt temperature above about 275° F. After all of the copolymer has been added, the melt temperature is raised to about 300° F. and agitated until the copolymer and resins are completely dispersed. The desired release agents are then added.

Articles of manufacture can be prepared in any manner which results in a deposition of coating on its surface. For example, the articles may be dipped in a hot melt and cooled to allow the coating to solidify. This coating can also be deposited utilizing common coating processes such as curtain coating, roll coating and spray coating. The same technique is followed when the solvent wax system is utilized. After coating, the solvent is evaporated. These coatings may be applied in any thickness. However, it is necessary that the thickness provide sufficient strength in the film to allow the film to remain in tact during stripping. Normally, coating thicknesses greater than 1 mil have this requisite strength.

The following examples are given to illustrate the preferred embodiments of this invention and should not be construed as limitations upon the invention. All parts are by weight.

Example I

The waxes of Table I were melted together and raised to a temperature of 300° F. The coumarone-indene resin was heated to 275° F. and then added to the hot melt. The ethylene-vinyl acetate copolymer was then added to the melt with constant and vigorous agitation while maintaining a melt temperature above 275° F. The melt temperature was raised to 300° F. after all of the copolymer had been added and maintained at that temperature for approximately 90 minutes until all of the copolymer had dissolved. The melt temperature was then lowered to 280° F. and the various release agents were added. The hot melt was deposited with a coating bar as 1 to 5 mil coatings on the surfaces of melamine-formaldehyde plaques. The coating was allowed to cool to room temperature and after a 24 hour period, its strippability was evaluated. With other plaques, immediately after the coating was cooled, it was reheated to 170° F. for 10 minutes and allowed to cool. After 24 hours at ambient temperatures, strippability was evaluated. The results are reported in 4 different categories:

Excellent (E) is used to designate a coating which could be easily and rapidly removed as a single continuous film. Good (G) denotes a coating which could be easily removed without the application of excessive force. However, at faster stripping rates it had a propensity to tear in random fashion along the direction of the force and thus was removed as several large pieces. Fair (F) designates a coating which could be stripped only by applying excessive force. Slow removal rates were necessary and even then it came off in the form of small random pieces. Poor (P) denotes a coating which had high adhesion requiring the application of excessive force at very slow removal rates. Small random pieces were obtained under these conditions. Not strippable (N.S.) means that the coating did not exhibit any stripping characteristics.

TABLE I

| Formulation No. | 1 | 2 | 3 |
|---|---|---|---|
| Wax [1] | 100 | 100 | 100 |
| Ethylene-vinyl acetate copolymer [2] | 44.3 | 44.3 | 44.3 |
| Coumarone-indene resin [3] | 16.4 | 16.4 | 16.4 |
| Hydrocarbon oil [4] | 3.3 | 3.3 | 6.6 |
| Oleoyl sarcosine [5] (an N-substituted fatty acid amide) | 0 | 1.6 | 0 |
| Strippability properties: | | | |
| 24 hours after cooling to 70° F | ([6]) | ([7]) | ([6]) |
| After heating coating to 170° F. for 10 minutes and then cooling to 70° F. for 24 hours | NS | G | NS |

[1] The wax was a blend of 70.5 parts microcrystalline wax having a melting point of 175° F. (ASTM D-127) and 29.5 parts of a fully refined paraffin wax having a melting point ranging from 150 to 155° F. (ASTM D-87). Both waxes had an oil content of less than 1 percent.
[2] An Ethylene-vinyl acetate copolymer having a bound vinyl-acetate content of 28 percent by weight and a melt index of 3.0 (ASTM D-1238-57T).
[3] Coumarone-indene resin having a ring and ball softening point of 38° C. (ASTM D-36-627).
[4] A solvent refined hydrocarbon oil comprised mainly of n-paraffins having a viscosity index of 110 to 115 and a viscosity at 210° F. of 43-46 SSU.
[5] With reference to the general formula set forth in the specification the oleo sarcosine is defined as follows: R is the fatty residue oleic acid R' is methyl, $n$ is 1, M is hydrogen. It was prepared by reacting oleic acid chloride with n-methyl amino acetic acid, ester and then saponifying the product to the acid.
[6] F to P.
[7] G to E.

Table I demonstrates that the addition of an N-substituted fatty acid amide to the prior art compositions greatly enhances the strippability. By comparing Formulation 3 with 2, it is demonstrated that even higher amounts of the prior art stripping agents (oil) will not impart this outstanding strippability.

Example 2

The compositions of Table II were prepared and evaluated in accordance with the methods set forth in Example I.

TABLE II

| Formulation No. | 4 | 5 | 6 | 7 | 8 | 9 | 10 | 11 |
|---|---|---|---|---|---|---|---|---|
| Wax [1] | 100 | 100 | 100 | 100 | 100 | 100 | 100 | 100. |
| Ethylene-vinyl acetate copolymer [2] | 42 | 42 | 42 | 42 | 42 | 42 | 42 | 42. |
| Coumarone indene resin [3] | 16.1 | 16.1 | 16.1 | 6.11 | 16.1 | 16.1 | 16.1 | 16.1. |
| Hydrocarbon oil [4] | 3.2 | 3.2 | 3.2 | 3.2 | 32 | 3.2 | 3.2 | 3.2. |
| Release agent type | | Oleoyl sarcosine.[5] | Oleoyl sarcosine.[5] | Oleoyl sarcosine.[6] | Oleoyl linoleoyl sarcosine.[7] | Tallow diamines.[8] | Hydrogenated tallow amide.[9] | Aliphatic amine.[10] |
| Amount | 0 | .8 | 1.6 | 1.6 | 1.6 | 1.6 | 1.6 | 1.6. |
| Strippability properties: | | | | | | | | |
| 24 hours after cooling to 70° F. | F | G to E | G to E | E | E | E | E | P. |
| After heating coating to 170° F. for 10 minutes and then cooling to 70° F. for 24 hours. | P | G | E | E | E | E | P | |

[1] The wax was a blend of 67.7 parts of microcrystalline wax having a melting point of 175° F. (ASTM D-127) and 32.3 parts of a microcrystalline wax having a melting point range of 190° to 195° F. (ASTM D-127). Both waxes were fully refined and had an oil content of less than 1 percent.
See footnotes (2), (3), (4), and (5) as defined in Table I.
[6] With reference to the general formula for the fatty acid amides set forth in the specification, stearoyl sarcosine is defined as follows: R is the fatty residue of stearic acid, R' is methyl, $n$ is 1, M is hydrogen. It was prepared by reacting oleic acid chloride with n-methyl amino acetic acid, ester and then saponifying the product to the acid.
[7] A blend containing 55% oleic sarcosine and 45% linoleoyl sarcosine. The oleic sarcosine was prepared as described in (5) of Table I and the linoleoyl sarcosine was prepared by reacting lineolic acid chloride with n-methyl amino acetic acid, ester and saponifying the procduct to the acid.
[8] The diamine had the following structural formula:

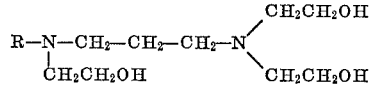

wherein R is the fatty residue derived from tallow.
[9] The hydrogenated tallow amide had the following structural formula:

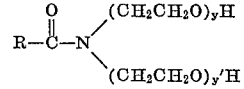

wherein R is the hydrogenated fatty residue of tallow, $y+y'$ equals 5 and the average molecular weight was 498.
[10] An aliphatic amine of the formula $R-NH_2$ wherein R is saturated aliphatic radical containing from 15 to 20 carbon atoms with an average carbon chain of 18 atoms.

Table II demonstrates the various types of release agents which may be utilized in the practice of this invention and demonstrates their improvement over the prior art. Specifically, Formulations 5–8 illustrate the improved strippability of coatings containing various N-fatty acid amides. Formulations 9 and 10 illustrate the improved strippability of coatings with a nitrogen containing compound. Formulation 4 is a prior art composition containing hydrocarbon oil as the sole release agent. Formulation 11 contains an amine which has not been alkoxylated. Both of these compositions do not provide satisfactory strippable coatings.

Example III

In order to demonstrate the effect of plasticizers, blends containing:

| | Parts |
|---|---|
| Wax | 100 |
| Ethylene-vinyl acetate copolymer | 81.8 |
| Plasticizer | 45.5 | were prepared in accordance with the method set forth in Example I. The wax component contained 25 percent by weight microcrystalline wax having a melting point of 175° F. (ASTM D–127) and 75 percent by weight of a paraffin wax having a melting point of 135° F. (ASTM D–87). The ethylene-vinyl acetate copolymer-28 percent by weight bound vinyl acetate and has a melt index of 3.0 (ASTM D–1238–57T).

The various plasticizers and their evaluations are set forth in Table III.

TABLE III

| Formulation No. | 12 | 13 | 14 | 15 | 16 | 17 |
|---|---|---|---|---|---|---|
| Plasticizer | (¹) | (²) | (³) | (⁴) | (⁵) | (⁶) |
| Hot melt viscosity at 300° F. (cp.) | 6,425 | 6,300 | 3,350 | 4,280 | 5,750 | 4,250 |
| Elongation, percent | 105 | 166 | 16 | 36 | 45 | 33 |
| Energy absorption factor, ft.-lbs./in.³ | 25.4 | 52.2 | 4.4 | 12.6 | 15.1 | 10 |

¹ Poly terpene.
² Coumarone indene resin.
³ Dioctyl adipate.
⁴ Dioctyl phthalate.
⁵ Epoxidized soybean oil.
⁶ Polybutene.

I claim:
1. A composition comprising in parts by weight:
(A) 100 parts of wax;
(B) from 10 to 300 parts of a polymeric composition consisting essentially of
  (i) from 40–100 weight percent of an ethylene-vinyl acetate copolymer wherein the vinyl acetate content ranges from 15–35 weight percent and,
  (ii) from 0.60 weight percent of a compound which is a plasticizer for the ethylene-vinyl acetate copolymer,
(C) in an amount sufficient to impart strippability of an N-substituted fatty acid amide having a structural formula:

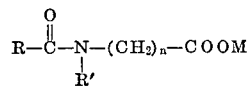

wherein R is an aliphatic radical containing 10–30 carbon atoms, R' is an alkyl group containing 1–4 carbon atoms, n is an integer from 1–4 and M is selected from the group consisting of hydrogen and alkali metals having an atomic number of less than 20;
(D) from 0 to 20 parts of hydrocarbon oil having a viscosity at 210° F. in excess of 25 SSU.

2. A composition according to claim 1 wherein the N-substituted fatty acid amide has a structural formula:

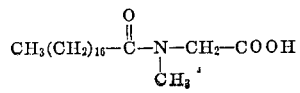

3. A composition according to claim 1 wherein the N-substituted fatty acid amide has the structural formula:

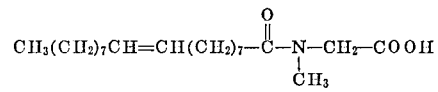

4. A composition according to claim 1 wherein the N-substituted fatty acid amide is a mixture containing
(a) 55 percent by weight of an N-substituted fatty acid amide having the structural formula:

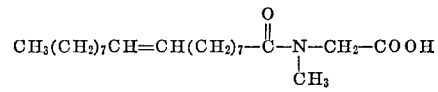

(b) 45 percent by weight of an N-substituted fatty acid amide having the structural formula:

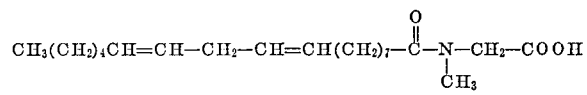

5. A composition of claim 1 wherein M is hydrogen, R' is methyl, and R is an aliphatic radical containing from 10 to 17 carbon atoms.

6. A composition according to claim 5 wherein the wax is a petroleum wax.

7. A composition according to claim 5 wherein the petroleum wax is a mixture comprising from 20–80 weight percent paraffin wax and from 80–20 weight percent microcrystalline wax.

8. A composition according to claim 5 wherein the polymeric composition is present in an amount ranging from 20–110 parts.

9. A composition according to claim 5 wherein the ethylene vinyl acetate copolymer has a vinyl acetate content ranging from 25–30 weight percent and a melt index of less than 25.

10. A composition according to claim 5 wherein the plasticizer is present in an amount ranging from 5–30 weight percent by weight of the polymeric composition.

11. A composition according to claim 5 wherein the plasticizer is a coumarone-indene resin having a softening point of less than 50° C.

12. A composition according to claim 5 wherein the plasticizer is an organic carboxylic acid.

13. A composition according to claim 8 wherein the hydrocarbon oil of Part D is present in an amount ranging from 4–10 parts and has a viscosity at 210° F. ranging from 35–500 SSU.

References Cited

UNITED STATES PATENTS

| | | | |
|---|---|---|---|
| 2,956,979 | 10/1960 | Rowland | 260—33.4 PO |
| 2,991,265 | 7/1961 | Clark | 260—32.6 PO |
| 3,048,265 | 8/1962 | Hackhel | 106—13 |
| 3,197,425 | 7/1965 | Konig | 260—32.6 PO |
| 3,206,429 | 9/1965 | Broyles | 260—32.6 PO |
| 3,330,793 | 7/1967 | Podlipnik | 260—28.5 AV |
| 3,354,106 | 11/1967 | Ilnyckyj | 260—28.5 AV |
| 3,396,137 | 8/1968 | Wharton | 260—28.5 A |
| 3,496,062 | 2/1970 | MacLeod | 260—28.5 AV |
| 3,498,962 | 3/1970 | Bruno | 106—13 |
| 3,207,716 | 9/1965 | Lippoldt | 260—28.5 AV |
| 3,362,839 | 1/1968 | Weindel | 260—28.5 AV |
| 3,407,161 | 10/1968 | Rundle | 260—28.5 |

FOREIGN PATENTS

| | | | |
|---|---|---|---|
| 37/16,431 | 10/1962 | Japan | 260—32.6 PO |

ALLAN LIEBERMAN, Primary Examiner

P. R. MICHL, Assistant Examiner

U.S. Cl. X.R.

117—6; 260—32.6 PQ